US011817557B2

United States Patent
Shin et al.

(10) Patent No.: US 11,817,557 B2
(45) Date of Patent: Nov. 14, 2023

(54) ELECTROLYTE FOR LITHIUM SECONDARY BATTERY

(71) Applicant: LG Chem, Ltd., Seoul (KR)

(72) Inventors: Won Kyung Shin, Daejeon (KR); Kyoung Ho Ahn, Daejeon (KR); Chul Haeng Lee, Daejeon (KR); Min Jung Kim, Daejeon (KR); Jae Won Lee, Daejeon (KR)

(73) Assignee: LG Energy Solution, Ltd.

(*) Notice: Subject to any disclaimer, the term of this patent is extended or adjusted under 35 U.S.C. 154(b) by 468 days.

(21) Appl. No.: 16/979,007

(22) PCT Filed: Jul. 26, 2019

(86) PCT No.: PCT/KR2019/009356
§ 371 (c)(1),
(2) Date: Sep. 8, 2020

(87) PCT Pub. No.: WO2020/036336
PCT Pub. Date: Feb. 20, 2020

(65) Prior Publication Data
US 2021/0202993 A1    Jul. 1, 2021

(30) Foreign Application Priority Data

Aug. 16, 2018 (KR) ........................ 10-2018-0095549

(51) Int. Cl.
| | |
|---|---|
| *H01M 10/0567* | (2010.01) |
| *H01M 10/0525* | (2010.01) |
| *H01M 10/0565* | (2010.01) |
| *H01M 10/0568* | (2010.01) |
| *C08F 283/04* | (2006.01) |

(52) U.S. Cl.
CPC ..... *H01M 10/0567* (2013.01); *C08F 283/045* (2013.01); *H01M 10/0525* (2013.01); *H01M 10/0565* (2013.01); *H01M 10/0568* (2013.01); *H01M 2300/0025* (2013.01); *H01M 2300/0082* (2013.01); *H01M 2300/0085* (2013.01)

(58) Field of Classification Search
CPC ......... H01M 10/0564; H01M 10/0565; H01M 10/0566; H01M 10/0567; H01M 10/0568; H01M 2300/0025; H01M 2300/0082; H01M 2300/0085
See application file for complete search history.

(56) References Cited

U.S. PATENT DOCUMENTS

| | | |
|---|---|---|
| 9,601,807 B2 | 3/2017 | Long |
| 2002/0168575 A1 | 11/2002 | Smith et al. |
| 2004/0146778 A1 | 7/2004 | Lee et al. |
| 2005/0084764 A1 | 4/2005 | Lee et al. |
| 2013/0244094 A1 | 9/2013 | Giroud et al. |
| 2016/0028111 A1 | 1/2016 | Ahn et al. |
| 2016/0043435 A1 | 2/2016 | DeSimone |
| 2017/0229735 A1* | 8/2017 | Ahn .................. H01M 10/0567 |
| 2019/0058217 A1 | 2/2019 | Ahn et al. |
| 2019/0074545 A1 | 3/2019 | Jeong et al. |

FOREIGN PATENT DOCUMENTS

| | | | |
|---|---|---|---|
| CN | 1601803 | A | 3/2005 |
| CN | 105552430 | A | 5/2016 |
| CN | 107768717 | * | 3/2018 |
| EP | 3203565 | A1 | 8/2017 |
| EP | 3361546 | A1 | 8/2018 |
| EP | 3407415 | A1 | 11/2018 |
| EP | 3419100 | A1 | 12/2018 |
| JP | H06283205 | A | 10/1994 |
| JP | H08295715 | A | 11/1996 |
| JP | 2005332779 | A | 12/2005 |
| JP | 2013541820 | A | 11/2013 |
| JP | 2014011095 | A | 1/2014 |
| JP | 2016520956 | A | 7/2016 |
| JP | 2018195518 | A | 12/2018 |
| KR | 20040020640 | A | 3/2004 |
| KR | 20150050508 | A | 5/2015 |
| KR | 20160040127 | A | 4/2016 |
| KR | 20180026356 | A | 3/2018 |
| WO | 2018105970 | A1 | 6/2018 |

OTHER PUBLICATIONS

CN 107768717 English translation. Bai et al. China. Mar. 6, 2018. (Year: 2018).*
Extended European Search Report including Written Opinion for Application No. 19849167.2 dated Apr. 29, 2021, 11 pages.
Hiu Ching Wong, Perfluoropolyether-Based Electrolytes for Lithium Battery Applications, Dissertation, University of North Carolina at Chapel Hill, 2015, 160 pages.
International Search Report for Application No. PCT/KR2019/009356, dated Oct. 29, 2019, pp. 1-2.
Takayuki et al., Dilution of Highly Concentrated LiBF4/Propylene Carbonate Electrolyte Solution with Fluoroalkyl Ethers for 5-V LiNi0.5Mn1.5O4 Positive Electrodes, Journal of The Electrochemical Society, Jan. 2017, pp. A6412-A6416, vol. 164, No. 1.

* cited by examiner

*Primary Examiner* — Christopher P Domone
(74) *Attorney, Agent, or Firm* — Lerner David LLP

(57) ABSTRACT

An electrolyte for a lithium secondary battery is disclosed herein. In some embodiments, an electrolyte includes a lithium salt having a concentration of 1.6 M to 5 M, an oligomer mixture which includes a first oligomer containing a unit represented by Formula 1 and a second oligomer containing a unit represented by Formula 2, and an organic solvent.

15 Claims, No Drawings

ELECTROLYTE FOR LITHIUM SECONDARY BATTERY

CROSS-REFERENCE TO RELATED APPLICATIONS

The present application is a national phase entry under 35 U.S.C. § 371 of International Application No. PCT/KR2019/009356, filed Jul. 26, 2019, which claims priority from Korean Patent Application No. 10-2018-0095549, filed Aug. 16, 2018, the disclosures of which are incorporated herein by reference.

TECHNICAL FIELD

The present invention relates to an electrolyte for a lithium secondary battery, and more particularly, to an electrolyte for a lithium secondary battery in which ionic conductivity and safety are improved while capacity characteristics are excellent by using a high-concentration lithium salt.

BACKGROUND ART

Applications of lithium secondary batteries have been rapidly expanded from power sources of portable devices, such as mobile phones, notebook computers, digital cameras, and camcorders, to power sources of medium and large sized devices such as power tools, electric bicycles, hybrid electric vehicles (HEVs), and plug-in hybrid electric vehicles (plug-in HEVs, PHEVs). Appearance and size of the batteries have also changed in various ways as these application areas expand and demand increases. In order to meet these needs, battery components must be able to achieve stable battery performance under high current conditions.

A lithium secondary battery is prepared by using materials capable of intercalating and deintercalating lithium ions as a negative electrode and a positive electrode, selectively including a separator between the two electrodes, and disposing an electrolyte between both electrodes, wherein electricity is generated or consumed by oxidation and reduction reactions caused by the intercalation and deintercalation of the lithium ions into and from the positive electrode and the negative electrode.

With the recent expansion of the application areas, utilization and importance of the lithium secondary batteries have been gradually increased, and, particularly, an improvement in output characteristics of the battery is required in an environment requiring high output, such as HEV/PHEV. The output characteristics of the battery are a measure of how large a current can flow for a given voltage, wherein, in general, output obtainable from the battery when the current increases tends to increase initially and then decrease after reaching a maximum value. This is related to a polarization phenomenon, wherein this is because a battery voltage decreases when the current increases above a certain value, and capacity obtainable in a given voltage range is also reduced. Since the polarization phenomenon is related to a diffusion rate of the lithium ions and internal resistance of the battery, it is necessary to improve the diffusion rate of the lithium ions and electrical conductivity properties to improve the output characteristics of the battery.

Recently, as a method for improving the output characteristics of the battery, a method of improving the output characteristics of the battery by increasing a lithium ion yield (Li$^+$ transference number) and a degree of dissociation of the lithium ions using an electrolyte containing a high-concentration lithium salt has been devised.

Since the use of the high-concentration lithium salt not only improves the output characteristics of the battery, but also reduces an amount of free solvent that does not bind with the lithium ions, high-temperature safety may also be improved. Specifically, in a case in which the battery is charged, since lithium may be deintercalated from a positive electrode active material, the battery is in a structurally unstable state, wherein, when the battery is exposed to high-temperature conditions, oxygen radicals may be generated while its structure collapses. Since the oxygen radicals generated in this case have very high reactivity, the oxygen radicals may react with the free solvent, which does not bind with the lithium ions, to cause an exothermic reaction. In such a case, if the high-concentration lithium salt is used in the electrolyte, the amount of the free solvent may be reduced, and the exothermic reaction may be suppressed to increase the high-temperature safety of the battery.

However, in a case in which the high-concentration lithium salt is used, viscosity of the electrolyte is increased. In this case, since mobility of ions in the electrolyte is inversely proportional to the viscosity of the electrolyte based on Stokes' law, ionic conductivity of the electrolyte may rather be reduced.

Thus, there is a need for an electrolyte for a lithium secondary battery which may maintain ionic conductivity of the battery above a predetermined level while improving the output characteristics, capacity characteristics, and high-temperature safety of the battery by using the high-concentration lithium salt.

(Patent Document 1) Korean Patent Application Laid-open Publication No. 10-2016-0040127

DISCLOSURE OF THE INVENTION

Technical Problem

An aspect of the present invention provides an electrolyte for a lithium secondary battery which may improve high-temperature safety while improving output characteristics and capacity characteristics of the lithium secondary battery by using a high-concentration lithium salt.

Technical Solution

According to an aspect of the present invention, there is provided an electrolyte for a lithium secondary battery which includes: a lithium salt having a concentration of 1.6 M to 5 M; an oligomer mixture which includes a first oligomer containing a unit represented by Formula 1 and a second oligomer containing a unit represented by Formula 2; and an organic solvent.

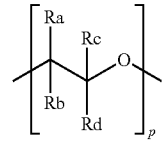

[Formula 1]

In Formula 1, $R_a$, $R_b$, $R_c$, and $R_d$ are each independently a fluorine element or an alkyl group having 1 to 3 carbon atoms which is unsubstituted or substituted with a fluorine element, and p is an integer of 1 to 50.

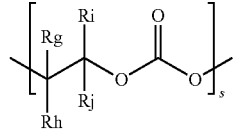

[Formula 2]

In Formula 2, Rg, Rh, Ri, and Rj are each independently hydrogen, or a substituted or unsubstituted alkyl group having 1 to 5 carbon atoms, and s is an integer of 1 to 50.

The concentration of the lithium salt may be in a range of 1.6 M to 4 M.

Also, the concentration of the lithium salt may be in a range of 1.6 M to 3 M.

The first oligomer may be an oligomer represented by Formula 1a below.

[Formula 1a]

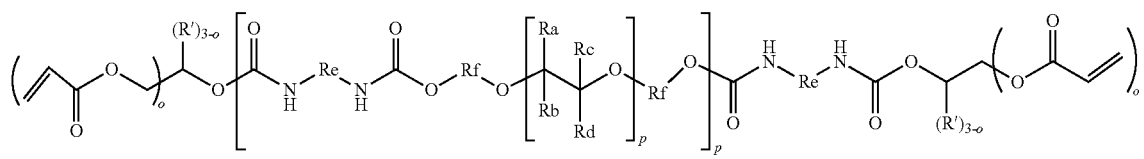

In Formula 1a, $R_a$, $R_b$, $R_c$, and $R_d$ are each independently a fluorine element or an alkyl group having 1 to 3 carbon atoms which is unsubstituted or substituted with a fluorine element, $R_e$ is an aliphatic hydrocarbon group or an aromatic hydrocarbon group, $R_f$ is an alkylene group having 1 to 5 carbon atoms which is unsubstituted or substituted with a fluorine element, R' is hydrogen or an alkyl group having 1 to 3 carbon atoms, o is an integer of 1 to 3, p is an integer of 1 to 50, and q is an integer of 1 to 15.

The first oligomer may be an oligomer represented by Formula 1b below.

[Formula 1b]

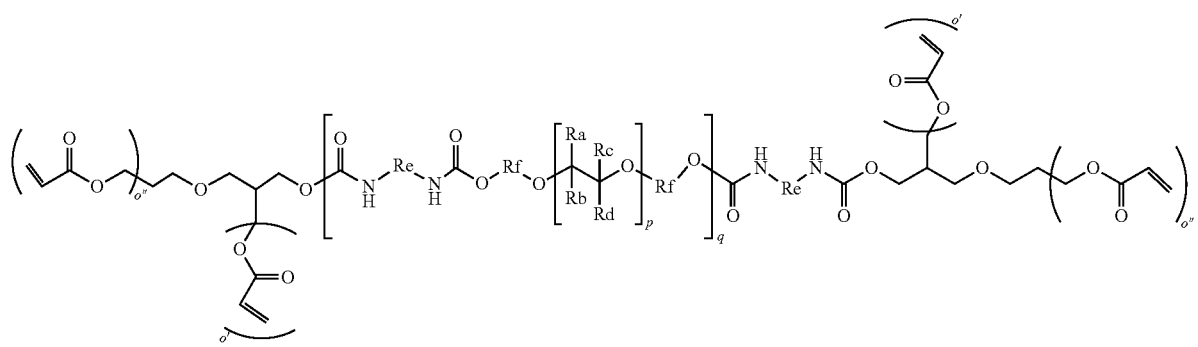

In Formula 1b, $R_a$, $R_b$, $R_c$, and $R_d$ are each independently a fluorine element or an alkyl group having 1 to 3 carbon atoms which is unsubstituted or substituted with a fluorine element, $R_e$ is an aliphatic hydrocarbon group or an aromatic hydrocarbon group, $R_f$ is an alkylene group having 1 to 5 carbon atoms which is unsubstituted or substituted with a fluorine element, o' is an integer of 1 to 2, o" is an integer of 1 to 3, p is an integer of 1 to 50, and q is an integer of 1 to 15.

The second oligomer may be an oligomer represented by Formula 2a below.

[Formula 2a]

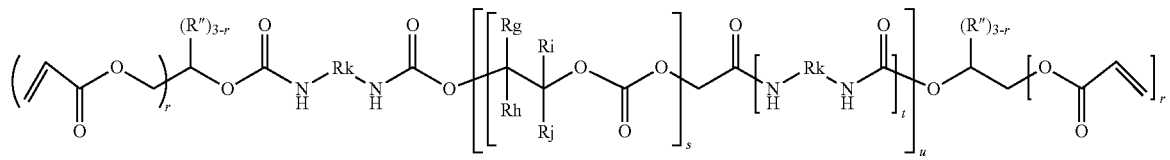

In Formula 2a, Rg, Rh, Ri, and Rj are each independently hydrogen, or a substituted or unsubstituted alkyl group having 1 to 5 carbon atoms, $R_k$ is an aliphatic hydrocarbon group or an aromatic hydrocarbon group, R″ is hydrogen or an alkyl group having 1 to 3 carbon atoms, r is an integer of 1 to 3, s is an integer of 1 to 50, t is an integer of 1 to 20, and u is an integer of 1 to 10.

The second oligomer may be an oligomer represented by Formula 2b below.

[Formula 2b]

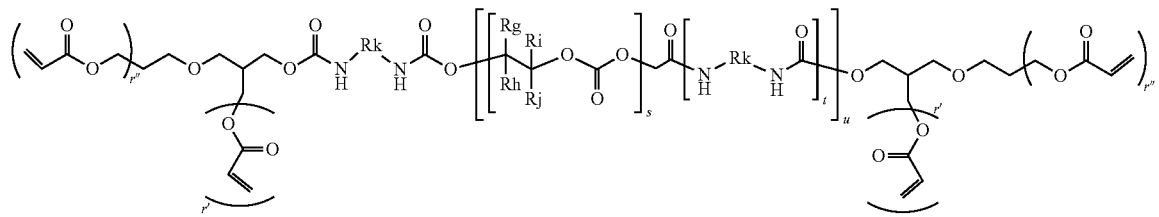

In Formula 2b, Rg, Rh, Ri, and Rj are each independently hydrogen, or a substituted or unsubstituted alkyl group having 1 to 5 carbon atoms, $R_k$ is an aliphatic hydrocarbon group or an aromatic hydrocarbon group, r' is an integer of 1 to 2, r″ is an integer of 1 to 3, s is an integer of 1 to 50, t is an integer of 1 to 20, and u is an integer of 1 to 10.

In another aspect, the electrolyte for a lithium secondary battery may further include a halogenated benzene compound represented by the following Formula 3, and the halogenated benzene compound represented by Formula 3 may be included in an amount of 0.01 part by weight or more to less than 50 parts by weight based on 100 parts by weight of the electrolyte for a lithium secondary battery.

[Formula 3]

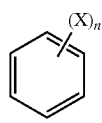

In Formula 3, X is at least one halogen element selected from the group consisting of fluorine (F), chlorine (Cl), and bromine (Br), and n is an integer of 1 to 3.

In an aspect, the electrolyte for a lithium secondary battery may be a liquid electrolyte.

In a case in which the electrolyte for a lithium secondary battery is a liquid electrolyte, the oligomer mixture may be included in an amount of 0.01 part by weight to 1 part by weight based on 100 parts by weight of the electrolyte for a lithium secondary battery.

In the case that the electrolyte for a lithium secondary battery is the liquid electrolyte, the first oligomer and the second oligomer may be mixed in a weight ratio of (10 to 50):(50 to 90).

In another aspect, the electrolyte for a lithium secondary battery may be a gel polymer electrolyte.

In a case in which the electrolyte for a lithium secondary battery is a gel polymer electrolyte, the oligomer mixture may be included in an amount of 2 parts by weight to parts by weight based on 100 parts by weight of the electrolyte for a lithium secondary battery.

In the case that the electrolyte for a lithium secondary battery is the gel polymer electrolyte, the first oligomer and the second oligomer may be mixed in a weight ratio of (1 to 50):(50 to 99).

In the case that the electrolyte for a lithium secondary battery is the gel polymer electrolyte, the electrolyte may further include a polymerization initiator.

Advantageous Effects

Since an electrolyte for a lithium secondary battery according to the present invention uses a high-concentration lithium salt, surface tension may be controlled below a predetermined level while ionic conductivity is high, and thus, initial capacity and high-temperature safety of the battery may be improved.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "weight-average molecular weight" may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

Electrolyte for Lithium Secondary Battery

An electrolyte for a lithium secondary battery according to the present invention may be an electrolyte for a lithium secondary battery which includes: a lithium salt having a concentration of 1.6 M to 5 M; an oligomer mixture which includes a first oligomer containing a unit represented by Formula 1 and a second oligomer containing a unit represented by Formula 2; and an organic solvent.

The lithium salt may be included in a concentration of 1.6 M to 5 M, preferably 1.6 M to 4 M, and more preferably 1.6 M to 3 M in the electrolyte for a lithium secondary battery. In a case in which the lithium salt is included within the above concentration range, since lithium ions are sufficiently supplied, output characteristics of the battery may be improved by improving a lithium ion yield (Li+ transference number) and a degree of dissociation of the lithium ions.

Also, in a case in which a high-concentration lithium salt is used, high-temperature safety may be improved by reducing an amount of free solvent that does not bind with the lithium ions. Specifically, in a case in which the battery is charged, since lithium may be deintercalated from a positive electrode active material, the battery is in a structurally unstable state, wherein, when the battery is exposed to high-temperature conditions, oxygen radicals may be generated while its structure collapses. Since the oxygen radicals generated in this case have very high reactivity, the oxygen radicals may react with the free solvent to cause an exothermic reaction. In this case, if the high-concentration lithium salt is used, since a large amount of the lithium ions may react with the free solvent to reduce the amount of the free solvent, the exothermic reaction may be suppressed to increase the high-temperature safety of the battery.

Specifically, any compound capable of providing lithium ions and used in a lithium secondary battery may be used as the lithium salt without particular limitation. Specifically, the lithium salt may include $Li^+$ as a cation, and one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ or, if necessary, a mixture of two or more thereof may be used as an anion.

The electrolyte for a lithium secondary battery includes an oligomer mixture which includes a first oligomer containing a unit represented by Formula 1 and a second oligomer containing a unit represented by Formula 2.

First, the first oligomer containing a unit represented by Formula 1 will be described.

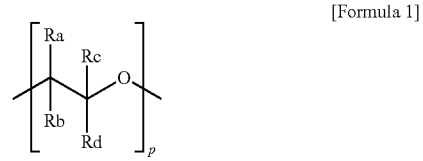

[Formula 1]

In Formula 1, $R_a$, $R_b$, $R_c$, and $R_d$ are each independently a fluorine element or an alkyl group having 1 to 3 carbon atoms which is unsubstituted or substituted with a fluorine element, and p is an integer of 1 to 50. p may preferably be an integer of 1 to 45, and may more preferably be an integer of 1 to 40.

Since the first oligomer containing a unit represented by Formula 1 includes an ethylene group substituted with a fluorine element having low reactivity with lithium ions, a side reaction of the lithium ions and a decomposition reaction of the lithium salt may be controlled, and thus, a side reaction, which occurs when the high-concentration lithium salt is used, may be suppressed. Also, since the first oligomer contains a fluorine element with excellent flame retardancy, heat generation and ignition phenomenon of the lithium secondary battery are suppressed when the electrolyte including the first oligomer is used, and thus, the high-temperature safety may be improved.

Specifically, the first oligomer may be an oligomer represented by Formula 1a below.

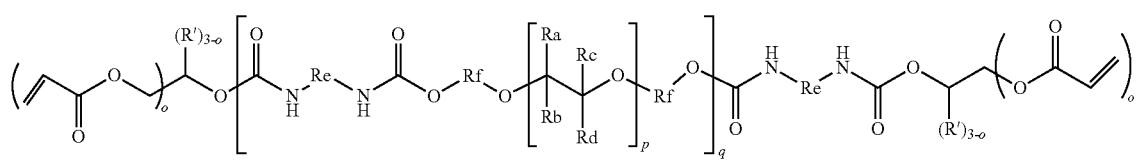

[Formula 1a]

In Formula 1a, $R_a$, $R_b$, $R_c$, and $R_d$ are each independently a fluorine element or an alkyl group having 1 to 3 carbon atoms which is unsubstituted or substituted with a fluorine element, $R_e$ is an aliphatic hydrocarbon group or an aromatic hydrocarbon group, $R_f$ is an alkylene group having 1 to 5 carbon atoms which is unsubstituted or substituted with a fluorine element, R' is hydrogen or an alkyl group having 1 to 3 carbon atoms, o is an integer of 1 to 3, p is an integer of 1 to 50, and q is an integer of 1 to 15. In this case, p may preferably be an integer of 1 to 45, and may more preferably be an integer of 1 to 40.

In the oligomer represented by Formula 1a, the aliphatic hydrocarbon group includes an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, in the oligomer represented by Formula 1a, the aromatic hydrocarbon group may include a substituted or unsubstituted arylene group having 6 to 20 carbon atoms; or a substituted or unsubstituted heteroarylene group having 2 to 20 carbon atoms.

As a specific example, the oligomer represented by Formula 1a may be an oligomer represented by Formula 1a-1 below.

[Formula 1a-1]

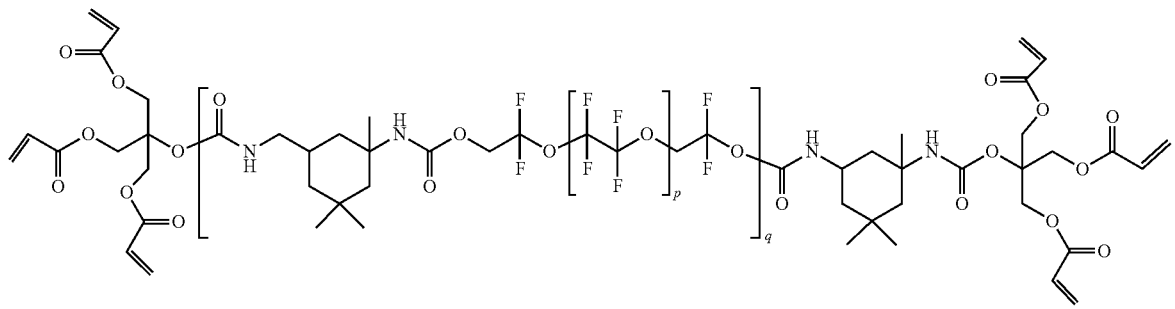

In Formula 1a-1, p is an integer of 1 to 50, and q is an integer of 1 to 15. p may preferably be an integer of 1 to 45, and may more preferably be an integer of 1 to 40.

Also, the first oligomer may be an oligomer represented by Formula 1b below.

[Formula 1b]

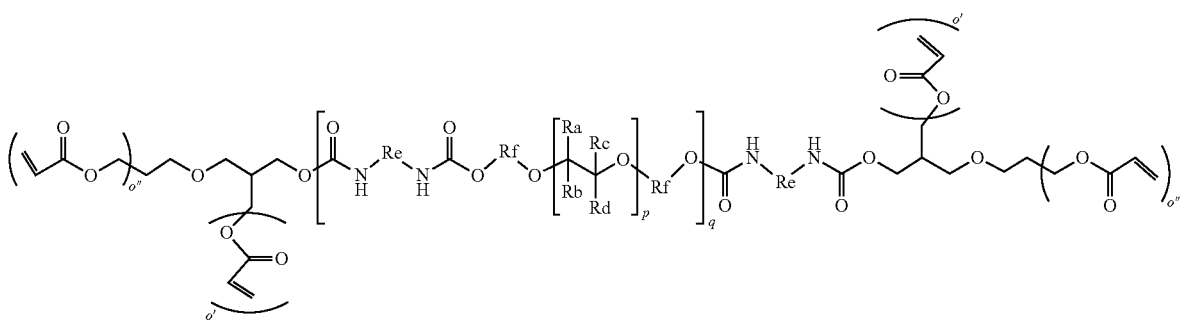

In Formula $R_a$, $R_b$, $R_c$, and $R_d$ are each independently a fluorine element or an alkyl group having 1 to 3 carbon atoms which is unsubstituted or substituted with a fluorine element, $R_e$ is an aliphatic hydrocarbon group or an aromatic hydrocarbon group, $R_f$ is an alkylene group having 1 to 5 carbon atoms which is unsubstituted or substituted with a fluorine element, o' is an integer of 1 to 2, o" is an integer of 1 to 3, p is an integer of 1 to 50, and q is an integer of 1 to 15. p may preferably be an integer of 1 to 45, and may more preferably be an integer of 1 to 40.

As a specific example, the oligomer represented by Formula 1b may be an oligomer represented by Formula 1b-1 below.

[Formula 1b-1]

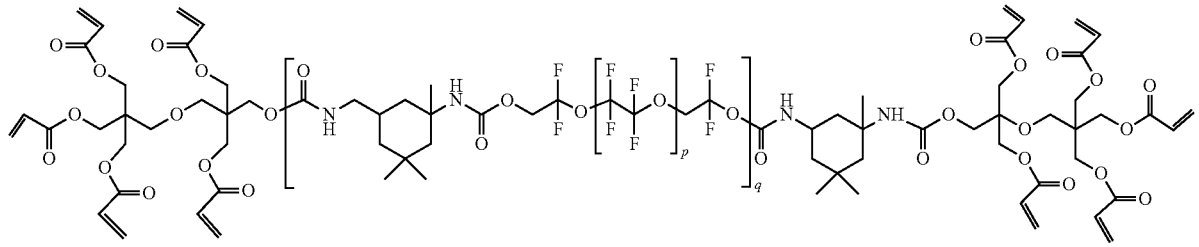

In Formula 1b-1, p is an integer of 1 to 50, and q is an integer of 1 to 15.

In this case, p may preferably be an integer of 1 to 45, and may more preferably be an integer of 1 to 40.

In a case in which the first oligomer represented by Formula 1a or Formula 1b is included as the electrolyte for a lithium secondary battery, since the first oligomer contains the unit represented by Formula 1 to maintain the accompanying properties and simultaneously contains an acrylate-based functional group as a hydrophilic part capable of forming a crosslink at both ends by itself as well as a fluorine-substituted ethylene group as a hydrophobic part, the first oligomer may further act as a surfactant to reduce surface resistance with an electrode interface. Thus, in a case in which the first oligomer represented by Formula 1a or Formula 1b is used, a wetting effect of the lithium secondary battery may be improved.

However, in a case in which the first oligomer represented by Formula 1a or Formula 1b is only used alone in the electrolyte, there is a limitation in that it is difficult to control reactivity of the acrylate group. Particularly, in a case in which the first oligomer is used in a gel polymer electrolyte, since a pre-gelation phenomenon between the first oligomers already occurs in a wetting process, as a process before a process of curing the first oligomer, there is a limitation in that the gel polymer electrolyte is not uniformly formed.

Thus, in order to address the limitation, since the reactivity of the acrylate group contained in the first oligomer represented by Formula 1a or Formula 1b is controlled by using the second oligomer containing a unit represented by Formula 2 together, the above-described limitation may be addressed.

Specifically, with respect to the second oligomer, it includes a carbonate group, wherein, since the carbonate group includes oxygen (O), free electron density is high. Thus, a degree of radical reaction of the acrylate group may be controlled.

In this case, a weight-average molecular weight (Mw) of the first oligomer represented by Formula 1a or Formula 1b may be controlled by the number of repeating units, and may be in a range of about 500 g/mol to about 200,000 g/mol, particularly 1,000 g/mol to 150,000 g/mol, and more particularly 2,000 g/mol to 100,000 g/mol. In a case in which the weight-average molecular weight of the first oligomer is within the above range, the first oligomer may be well dispersed due to high affinity with the organic solvent, wetting of the electrolyte may be improved by reducing the surface tension below a predetermined level, the decomposition reaction of the lithium salt may be suppressed, and a side reaction caused by lithium ions may be prevented.

Next, the second oligomer containing a unit represented by Formula 2 will be described.

[Formula 2]

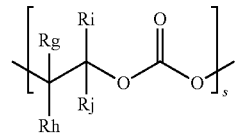

In Formula 2, Rg, Rh, Ri, and Rj are each independently hydrogen, or a substituted or unsubstituted alkyl group having 1 to 5 carbon atoms, and s is an integer of 1 to 50.

s may preferably be an integer of 1 to 45, and may more preferably be an integer of 1 to 40.

The second oligomer may be an oligomer represented by Formula 2a below.

[Formula 2a]

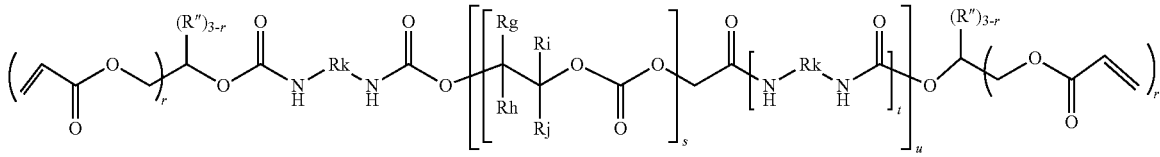

In Formula 2a, Rg, Rh, Ri, and Rj are each independently hydrogen, or a substituted or unsubstituted alkyl group having 1 to 5 carbon atoms, Rk is an aliphatic hydrocarbon group or an aromatic hydrocarbon group, R" is hydrogen or an alkyl group having 1 to 3 carbon atoms, r is an integer of 1 to 3, s is an integer of 1 to 50, t is an integer of 1 to 20, and u is an integer of 1 to 10.

s may preferably be an integer of 1 to 45, and may more preferably be an integer of 1 to 40.

In the oligomer represented by Formula 2a, the aliphatic hydrocarbon group includes an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, in the oligomer represented by Formula 2a, the aromatic hydrocarbon group may include a substituted or unsubstituted arylene group having 6 to 20 carbon atoms; or a substituted or unsubstituted heteroarylene group having 2 to 20 carbon atoms.

As a specific example, the oligomer represented by Formula 2a may be an oligomer represented by Formula 2a-1 below.

group or an aromatic hydrocarbon group, r' is an integer of 1 to 2, r" is an integer of 1 to 3, s is an integer of 1 to 50, t is an integer of 1 to 20, and u is an integer of 1 to 10.

In the oligomer represented by Formula 2b, the aliphatic hydrocarbon group includes an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

[Formula 2a-1]

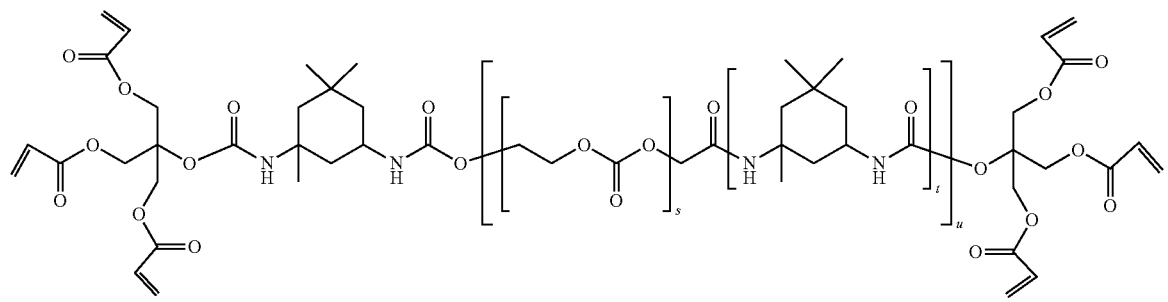

s is an integer of 1 to 50, t is an integer of 1 to 20, and u is an integer of 1 to 10. s may preferably be an integer of 1 to 45, and may more preferably be an integer of 1 to 40.

Also, the second oligomer may be an oligomer represented by Formula 2b below.

Furthermore, in the oligomer represented by Formula 2b, the aromatic hydrocarbon group may include a substituted or unsubstituted arylene group having 6 to 20 carbon atoms; or a substituted or unsubstituted heteroarylene group having 2 to 20 carbon atoms.

[Formula 2b]

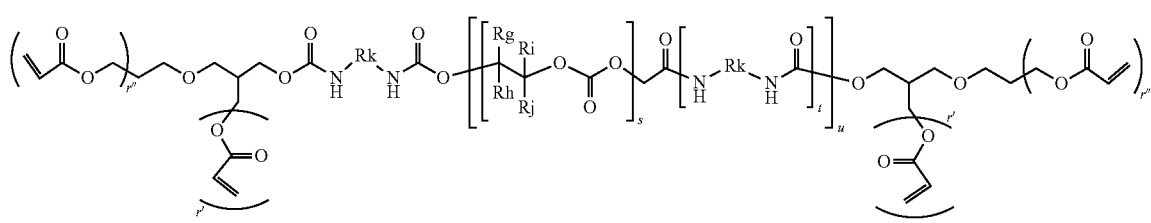

In Formula 2b, $R_g$, $R_h$, $R_i$, and $R_j$ are each independently hydrogen, or a substituted or unsubstituted alkyl group having 1 to 5 carbon atoms, $R_k$ is an aliphatic hydrocarbon As a specific example, the oligomer represented by Formula 2b may be an oligomer represented by Formula 2b-1 below.

[Formula 2b-1]

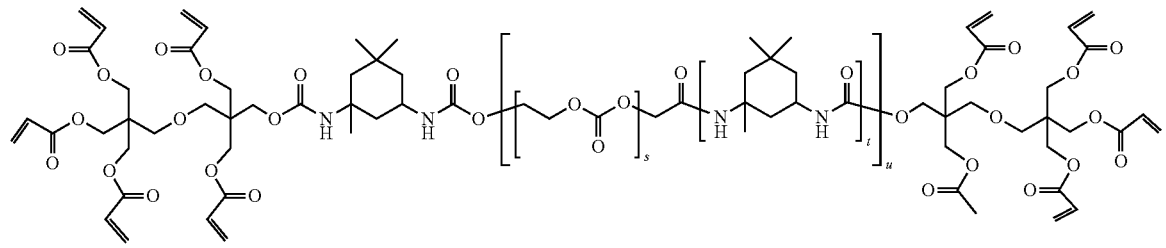

s is an integer of 1 to 50, t is an integer of 1 to 20, and u is an integer of 1 to 10. s may preferably be an integer of 1 to 45, and may more preferably be an integer of 1 to 40.

The second oligomer containing a unit represented by Formula 2 includes a carbonate group, wherein, since the carbonate group has high affinity with the organic solvent and has excellent ability to dissociate the lithium salt, the carbonate group may improve lithium ion dissociation number (lithium ion solvation).

However, in a case in which the second oligomer is only used alone in the electrolyte, since the surface tension and viscosity are high, there is a limitation in that the wetting of the electrolyte may be relatively deteriorated.

In this case, in a case in which the first oligomer containing the fluorine element is used together, since the first oligomer may act as a surfactant, the surface tension of the electrolyte may be reduced. Thus, in a case in which the first oligomer and the second oligomer are used together, since a degree of dissociation of the lithium salt in the electrolyte is improved to improve the output characteristics of the battery and to simultaneously maintain the wetting of the electrolyte above a predetermined level, interfacial properties between the electrolyte and an electrode may also be maintained well.

In this case, a weight-average molecular weight (Mw) of the second oligomer represented by Formula 2a or Formula 2b may be controlled by the number of repeating units, and may be in a range of about 500 g/mol to about 200,000 g/mol, particularly 1,000 g/mol to 150,000 g/mol, and more particularly 2,000 g/mol to 100,000 g/mol. In a case in which the weight-average molecular weight of the second oligomer is within the above range, since the second oligomer may be dissolved in the electrolyte to a predetermined level, dispersibility may be maintained.

The electrolyte for a lithium secondary battery may further include a halogenated benzene compound represented by the following Formula 3 to further improve charge and discharge cycle characteristics of the battery and improve flame retardancy of the electrolyte.

[Formula 3]

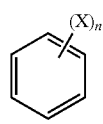

In Formula 3, X is at least one halogen element selected from the group consisting of fluorine (F), chlorine (Cl), and bromine (Br), and n is an integer of 1 to 3.

In this case, the halogenated benzene compound represented by Formula 3 may be included in an amount of 0.01 part by weight or more to less than 50 parts by weight, for example, 2 parts by weight to 40 parts by weight based on 100 parts by weight of the electrolyte for a lithium secondary battery.

Specific examples of the halogenated benzene compound represented by Formula 3 may be fluorobenzene, difluorobenzene, trifluorobenzene, chlorobenzene, dichlorobenzene, trichlorobenzene, bromobenzene, dibromobenzene, chlorofluorobenzene, and bromofluorobenzene, and a mixture of at least one thereof may be used.

Specifically, the electrolyte for a lithium secondary battery may be a liquid electrolyte or a gel polymer electrolyte. In this case, an amount of the oligomer mixture included and a mixing ratio between the first and second oligomers also vary depending on a type of the electrolyte for a lithium secondary battery.

For example, in a case in which the electrolyte for a lithium secondary battery is a liquid electrolyte, the oligomer mixture may be included in an amount of 0.01 part by weight to 1 part by weight, preferably 0.025 part by weight to 0.75 part by weight, and more preferably 0.05 part by weight to 0.75 part by weight based on 100 parts by weight of the electrolyte for a lithium secondary battery. In a case in which the oligomer mixture is included in an amount within the above range, an electrolyte having excellent wetting and high degree of dissociation of the lithium salt may be provided.

In the case that the electrolyte for a lithium secondary battery is the liquid electrolyte, the first oligomer and the second oligomer are mixed in a weight ratio of (10 to 50):(50 to 90), preferably (10 to 45):(55 to 90), and more preferably (10 to 40):(60 to 90). In a case in which the first and second oligomers are mixed within the above range, since the surface tension of the electrolyte may be maintained at a predetermined level, the wetting of the electrolyte may be controlled.

As another example, in a case in which the electrolyte for a lithium secondary battery is a gel polymer electrolyte, the oligomer mixture may be included in an amount of 2 parts by weight to 10 parts by weight, preferably 2 parts by weight to 9 parts by weight, and more preferably 2 parts by weight to 8 parts by weight based on 100 parts by weight of the electrolyte for a lithium secondary battery. In a case in which the oligomer mixture is included in an amount within the above range, the oligomers may stably form a polymer network structure, and may maintain the wetting of the electrolyte above a predetermined level. Since mobility of lithium ions is improved, ionic conductivity of the lithium ions may be maintained above a predetermined level even if the viscosity is somewhat increased by using the high-concentration lithium salt.

In the case that the electrolyte for a lithium secondary battery is the gel polymer electrolyte, the first oligomer and the second oligomer are mixed in a weight ratio of (1 to 50):(50 to 99), preferably (1 to 45):(55 to 99), and more preferably (1 to 40):(60 to 99). In a case in which the first and second oligomers are mixed within the above range, since the surface tension of the electrolyte may be maintained at a predetermined level, the wetting of the electrolyte may be controlled.

In the case that the electrolyte for a lithium secondary battery is the gel polymer electrolyte, the electrolyte further includes a polymerization initiator. A thermal polymerization or photopolymerization method may be used depending on a type of polymerization reaction, and a typical polymerization initiator known in the art may be used as the polymerization initiator. For example, the polymerization initiator may include at least one selected from the group consisting of an azo-based compound, a peroxide-based compound, and a mixture thereof.

Specifically, the polymerization initiator includes organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and at least one azo-based compound selected from the group consisting of 2,2'-azobis(2-cyanobutane), dimethyl 2,2'-azobis(2-methylpropionate), 2,2'-azobis(methylbutyronitrile), 2,2'-azobis(iso-butyronitrile) (AIBN), and 2,2'-azobisdimethyl-valeronitrile (AMVN), but the present invention is not limited thereto.

The polymerization initiator may be included in an amount of 0.1 wt % to 5 wt %, preferably 0.1 wt % to 4 wt %, and more preferably 0.1 wt % to 3 wt % based on a total weight of the oligomer mixture. In a case in which the polymerization initiator is included in an amount within the above range, the remaining of an unreacted polymerization initiator may be minimized, and gelation may occur above a certain level.

In the case that the electrolyte for a lithium secondary battery is the gel polymer electrolyte, the gel polymer electrolyte may be formed through a curing process. In this case, in order to be cured into the gel polymer electrolyte, the curing may be performed by using an electron beam (E-beam), γ-rays, and a room temperature or high temperature aging process. According to an embodiment of the present invention, the curing may be performed by thermal curing. In this case, curing time required may be in a range of about 2 minutes to about 48 hours, and thermal curing temperature may be in a range of 40° C. to 100° C., for example, 40° C. to 80° C.

Any organic solvent typically used in an electrolyte for a lithium secondary battery may be used as the organic solvent without limitation. For example, an ether compound, an ester compound, an amide compound, a linear carbonate compound, or a cyclic carbonate compound may be used alone or as a mixture of two or more thereof.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, cyclic carbonates, such as ethylene carbonate and propylene carbonate, which are known to well dissociate the lithium salt in the electrolyte due to high permittivity as highly viscous organic solvents, among the carbonate-based organic solvents may be used, and an electrolyte solution having high electrical conductivity may be prepared when the cyclic carbonate is mixed with low viscosity, low permittivity linear carbonate, such as dimethyl carbonate and diethyl carbonate, in an appropriate ratio.

Also, as the ether compound, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound, any one selected from the group consisting of linear esters, such as methyl acetate, ethyl acetate, propyl acetate, methyl propionate, ethyl propionate, propyl propionate, and butyl propionate; and cyclic esters, such as γ-butyrolactone, γ-valerolactone, γ-caprolactone, σ-valerolactone, and ε-caprolactone, or a mixture of two or more thereof may be used, but the present invention is not limited thereto.

The electrolyte for a lithium secondary battery according to the present invention may further include an additive. As a specific example of the additive, at least one compound selected from the group consisting of vinylene carbonate (VC), propane sultone (PS), polyphenylene sulfide, succinonitrile (SN), propene sultone (PRS), vinyl ethylene carbonate, lithium difluoro(oxalate)borate (LiODFB), ethylene sulfate, adiponitrile, and lithium bis(oxalato)borate may be used as the additive. In a case in which the above-listed compounds are used together as the additive, a stable film may be formed on both positive electrode and negative electrode at the same time. In this case, since the decomposition of the electrolyte may not only be suppressed even under high-temperature and high-pressure conditions by the film formed on the negative electrode, but dissolution of transition metal included in the positive electrode may also be suppressed by the film formed on the positive electrode, high-temperature and high-pressure characteristics and stability of the battery may be improved.

Next, a lithium secondary battery according to the present invention will be described.

The lithium secondary battery according to an embodiment of the present invention includes at least one positive electrode, at least one negative electrode, a separator which may be selectively disposed between the positive electrode and the negative electrode, and the electrolyte for a lithium secondary battery. In this case, since the electrolyte for a lithium secondary battery is the same as described above, a detailed description thereof will be omitted.

The positive electrode may be prepared by coating a positive electrode collector with a positive electrode active material slurry including a positive electrode active material, a binder for an electrode, an electrode conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $Li Mn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_zO_4$ (where $0<Z1<2$), etc) lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$), $LiMn_{2-Z2}Co_{z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 60 wt % to 98 wt %, preferably 70 wt % to 98 wt %, and more preferably 80 wt % to 98 wt % based on a total weight of a solid content excluding the solvent in the positive electrode active material slurry.

The binder for an electrode is a component that assists in the binding between the positive electrode active material and the electrode conductive agent and in the binding with the current collector. Specifically, the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluoro rubber, various copolymers, and the like. The binder for an electrode may be commonly included in an amount of 1 wt % to 20 wt %, preferably 1 wt % to 15 wt %, and more preferably 1 wt % to 10 wt % based on the total weight of the solid content excluding the solvent in the positive electrode active material slurry.

The electrode conductive agent is a component for further improving the conductivity of the positive electrode active material. Any electrode conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon). The electrode conductive agent may be included in an amount of 1 wt % to 20 wt %, preferably 1 wt % to 15 wt %, and more preferably 1 wt % to 10 wt % based on the total weight of the solid content excluding the solvent in the positive electrode active material slurry.

The solvent may include an organic solvent, such as N-methyl-2-pyrrolidone (NMP), and may be used in an amount such that desirable viscosity is obtained when the positive electrode active material as well as selectively the binder for a positive electrode and the positive electrode conductive agent is included. For example, the solvent may be included in an amount such that a concentration of a solid content including the positive electrode active material as well as selectively the binder for a positive electrode and the positive electrode conductive agent is in a range of 60 wt % to 95 wt %, preferably 70 wt % to 95 wt %, and more preferably 70 wt % to 90 wt %.

Also, the negative electrode, for example, may be prepared by coating a negative electrode collector with a negative electrode active material slurry including a negative electrode active material, a binder for a negative electrode, a negative electrode conductive agent, and a solvent. A metal current collector itself may be used as the negative electrode.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides (MeOx) of the metals (Me); and composites of the metals (Me) and carbon.

The negative electrode active material may be included in an amount of 60 wt % to 98 wt %, preferably 70 wt % to 98 wt %, and more preferably 80 wt % to 98 wt % based on a total weight of a solid content excluding the solvent in the negative electrode active material slurry.

Since the binder for an electrode, the electrode conductive agent, and the solvent are the same as described above, detailed descriptions thereof will be omitted.

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1

(1) Preparation of Liquid Electrolyte for Lithium Secondary Battery

After 0.05 wt % of the first oligomer (weight-average molecular weight (Mw): 3,000 g/mol, p=5, and q=10) represented by Formula 1a-1 and 0.45 wt % of the second oligomer (weight-average molecular weight (Mw): 3,000 g/mol, s=11, t=10, and u=2) represented by Formula 2b-1 were added to an organic solvent including ethylene carbonate (EC) and dimethyl carbonate (DMC) at a volume ratio of 1:9, a liquid electrolyte for a lithium secondary battery was prepared by adding $LiPF_6$ such that a concentration of the $LiPF_6$ was 2 M.

(2) Positive Electrode Preparation

A positive electrode active material ($Li(Ni_{0.8}Co_{0.1}Mn_{0.1})O_2$, NCM811), a conductive agent (bundle-type carbon nanotubes), and a binder (polyvinylidene fluoride (PVDF)) were mixed in N-methyl-2-pyrrolidone (NMP), as a solvent, in a weight ratio of 97.7:0.3:2 to prepare a positive electrode active material slurry. A 20 μm thick positive electrode collector (aluminum (Al) thin film) was coated with the positive electrode active material slurry, dried, and roll-pressed to prepare a positive electrode.

(3) Negative Electrode Preparation

A negative electrode active material (graphite (AGP8)), a conductive agent (carbon black), and a binder (polyvinylidene fluoride (PVDF)) were mixed in distilled water, as a solvent, in a weight ratio of 97:0.5:2.5 to prepare a negative electrode active material slurry. A 10 μm thick negative electrode collector (copper (Cu) thin film) was coated with the negative electrode active material slurry, dried, and roll-pressed to prepare a negative electrode.

(4) Lithium Secondary Battery Preparation

After an electrode assembly was prepared by sequentially stacking the positive electrode and negative electrode prepared by the above-described methods with a porous polyethylene film, as a separator, in the order of the positive electrode/separator/negative electrode, the electrode assembly was accommodated in a pouch-type secondary battery case, and the liquid electrolyte for a lithium secondary battery was injected into the pouch-type secondary battery case to prepare a lithium secondary battery.

2. Example 2

A liquid electrolyte for a lithium secondary battery and a lithium secondary battery were prepared in the same manner as in Example 1 except that 0.2 wt % of the first oligomer and 0.3 wt % of the second oligomer were added when the electrolyte for a lithium secondary battery was prepared.

3. Example 3

(1) Preparation of Composition for Gel Polymer Electrolyte for Lithium Secondary Battery After 0.5 wt % of the first oligomer (weight-average molecular weight (Mw): 3,000 g/mol, p=5, and q=10) represented by Formula 1a-1 and 4.5 wt % of the second oligomer (weight-average molecular weight (Mw): 3,000 g/mol, s=11, t=10, and u=2) represented by Formula 2b-1 were added to an organic solvent including ethylene carbonate (EC) and dimethyl carbonate (DMC) at a volume ratio of 1:9, a composition for a gel polymer electrolyte for a lithium secondary battery was prepared by adding $LiPF_6$ such that a concentration of the $LiPF_6$ was 2 M, and adding 0.4 wt % of 2,2'-azobis(iso-butyronitrile) (AIBN), as a polymerization initiator, based on a total weight of the first and second oligomer mixture.

(2) Gel Polymer Electrolyte for Lithium Secondary Battery and Lithium Secondary Battery Preparation After a positive and a negative electrode were prepared in the same manner as in Example 1, an electrode assembly was prepared by sequentially stacking the positive electrode and negative electrode thus prepared with a separator, the electrode assembly was accommodated in a pouch-type secondary battery case, the composition for a gel polymer electrolyte for a lithium secondary battery according to Example 3 was injected into the pouch-type secondary battery case, and the pouch-type secondary battery case was then stored at 25° C. for 3 days (room temperature aging). Thereafter, the pouch-type secondary battery case was stored at 60° C. for 24 hours (curing the composition for a gel polymer electrolyte) to prepare a lithium secondary battery in which the gel polymer electrolyte for a lithium secondary battery was formed.

4. Example 4

A gel polymer electrolyte for a lithium secondary battery and a lithium secondary battery were prepared in the same manner as in Example 3 except that 0.15 wt % of the first oligomer and 2.85 wt % of the second oligomer were added when a composition for a gel polymer electrolyte for a lithium secondary battery was prepared.

COMPARATIVE EXAMPLES

1. Comparative Example 1

A liquid electrolyte for a lithium secondary battery and a lithium secondary battery were prepared in the same manner as in Example 1 except that both the first oligomer and the second oligomer were not added to an organic solvent including ethylene carbonate (EC) and ethyl methyl carbonate (EMC) at a volume ratio of 3:7, and LiPF$_6$ was added such that a concentration of the LiPF$_6$ was 1.2 M when the liquid electrolyte for a lithium secondary battery was prepared.

2. Comparative Example 2

A liquid electrolyte for a lithium secondary battery was attempted to be prepared in the same manner as in Example 1 except that LiPF$_6$ was added such that a concentration of the LiPF$_6$ was 5.5 M when the liquid electrolyte for a lithium secondary battery was prepared, but, since the LiPF$_6$ was not sufficiently dissolved in the electrolyte, the liquid electrolyte for a lithium secondary battery may not be prepared.

3. Comparative Example 3

A liquid electrolyte for a lithium secondary battery and a lithium secondary battery were prepared in the same manner as in Example 1 except that LiPF$_6$ was added such that a concentration of the LiPF$_6$ was 1 M when the liquid electrolyte for a lithium secondary battery was prepared.

4. Comparative Example 4

A liquid electrolyte for a lithium secondary battery and a lithium secondary battery were prepared in the same manner as in Example 1 except that both the first oligomer and the second oligomer were not added when the liquid electrolyte for a lithium secondary battery was prepared.

5. Comparative Example 5

A liquid electrolyte for a lithium secondary battery and a lithium secondary battery were prepared in the same manner as in Example 1 except that 0.5 wt % of the first oligomer was added alone when the liquid electrolyte for a lithium secondary battery was prepared.

6. Comparative Example 6

A liquid electrolyte for a lithium secondary battery and a lithium secondary battery were prepared in the same manner as in Example 1 except that 0.5 wt % of the second oligomer was added alone when the liquid electrolyte for a lithium secondary battery was prepared.

7. Comparative Example 7

A gel polymer electrolyte for a lithium secondary battery and a lithium secondary battery were prepared in the same manner as in Example 3 except that 5 wt % of the first oligomer was added alone when a composition for a gel polymer electrolyte for a lithium secondary battery was prepared.

8. Comparative Example 8

A gel polymer electrolyte for a lithium secondary battery and a lithium secondary battery were prepared in the same manner as in Example 3 except that 5 wt % of the second oligomer was added alone when a composition for a gel polymer electrolyte for a lithium secondary battery was prepared.

EXPERIMENTAL EXAMPLES

1. Experimental Example 1: Surface Tension Evaluation

Surface tensions of the electrolytes for a lithium secondary battery, which were prepared in Examples 1 and 2 and Comparative Examples 1 to 6, were measured. The surface tension was repeatedly measured three times or more by a Du Nouy ring method using a TENSIOMETER. The measured surface tensions are presented in Table 1 below.

TABLE 1

|  | Surface tension (mN/m) |
|---|---|
| Example 1 | 25.7 |
| Example 2 | 22.5 |
| Comparative Example 1 | 30.8 |
| Comparative Example 2 | Not measurable |
| Comparative Example 3 | 25.5 |
| Comparative Example 4 | 34 |
| Comparative Example 5 | 20.1 |
| Comparative Example 6 | 31.9 |

Referring to Table 1, it may be confirmed that surface tensions of the examples were relatively lower than those of the comparative examples. With respect to Comparative Examples 3 and 5, it may be confirmed that the surface tensions were maintained at similar levels when compared with those of the examples, but ionic conductivities and initial capacities were lower than those of the examples as will be described below.

2. Experimental Example 2: Ionic Conductivity Measurement

Ionic conductivities of the electrolytes for a lithium secondary battery, which were prepared in Examples 1 to 4 and Comparative Examples 1 to 8, were measured.

With respect to Examples 1 and 2 and Comparative Examples 1 to 6, ionic conductivities at room temperature (25° C.) and low temperature (0° C.) were measured using a probe-type ionic conductivity meter (probe: InLab 731, model: 5470, manufacturer: Mettler Toledo).

A band-type conductive glass substrate was coated with each of the compositions for a gel polymer electrolyte for a lithium secondary battery which were prepared in Examples 3 and 4 and Comparative Examples 7 and 8, was thermally cured at 65° C. for 5 hours, and was then sufficiently dried. Subsequently, after a circular platinum (Pt) electrode with a diameter of 1 mm was coated on each of the films using a sputtering method in an argon atmosphere, the ionic conductivities at room temperature (25° C.) and low temperature (0° C.) were measured using an alternating current impedance method. The ionic conductivities were measured in a frequency range of 0.1 Hz to 100 MHz using a VMP3 measurement instrument and 4294A. The measured ionic conductivities are presented in Table 2 below.

TABLE 2

|  | Room-temperature ionic conductivity (25° C., mS/cm) | Low-temperature ionic conductivity (0° C., mS/cm) |
|---|---|---|
| Example 1 | 11.5 | 7.2 |
| Example 2 | 10.1 | 6.9 |

TABLE 2-continued

|  | Room-temperature ionic conductivity (25° C., mS/cm) | Low-temperature ionic conductivity (0° C., mS/cm) |
|---|---|---|
| Example 3 | 9.5 | 6.3 |
| Example 4 | 9.3 | 6.2 |
| Comparative Example 1 | 8.7 | 3.9 |
| Comparative Example 2 | Not measurable | Not measurable |
| Comparative Example 3 | 7.6 | Not measurable |
| Comparative Example 4 | 10 | 5.2 |
| Comparative Example 5 | 10.4 | 5.9 |
| Comparative Example 6 | 11.2 | 6.5 |
| Comparative Example 7 | 9.2 | 5.9 |
| Comparative Example 8 | 9.0 | 6.1 |

Referring to Table 2, it may be confirmed that the room-temperature ionic conductivities of the examples were maintained at higher or similar levels to those of the comparative examples. With respect to the low-temperature ionic conductivities, it may be confirmed that the examples had higher values. Since the electrolyte of Comparative Example 3 began to freeze at the low temperature, it may be confirmed that it was difficult to measure the ionic conductivity at the low temperature.

3. Experimental Example 3: Initial Capacity and Resistance Measurement

After formation was performed on each of the lithium secondary batteries prepared in Examples 1 to 4 and Comparative Examples 1 to 8 at a current of 14 mA (0.1 C rate), constant current/constant voltage (CC/CV) charging at 47 mA (0.33 C, 0.05 C cut-off) to 4.2 V and CC discharging at 47 mA (0.33 C) to 3 V were repeated 3 times. In this case, $3^{rd}$ discharge capacity was measured as initial capacity.

After the measurement of the initial capacity, a voltage drop generated when each of the fully-charged lithium secondary batteries was discharged at a current of 350 mA (2.5 C) for 10 seconds at room temperature (25° C.) was recorded, and a DC resistance value calculated using R=V/I (Ohm's law) was measured as initial resistance. In this case, the results of the measured initial capacities and initial resistances are presented in Table 3 below.

TABLE 3

|  | Initial capacity (Ah) | Initial resistance (Ohm) |
|---|---|---|
| Example 1 | 2.02 | 38 |
| Example 2 | 2.01 | 40 |
| Example 3 | 2.02 | 44 |
| Example 4 | 2.01 | 45 |
| Comparative Example 1 | 1.99 | 42 |
| Comparative Example 2 | Not measurable | Not measurable |
| Comparative Example 3 | Not measurable | Not measurable |
| Comparative Example 4 | 1.96 | 48 |
| Comparative Example 5 | 1.95 | 52 |
| Comparative Example 6 | 1.94 | 55 |
| Comparative Example 7 | 1.92 | 51 |
| Comparative Example 8 | 1.93 | 49 |

Referring to Table 3, it may be confirmed that the initial capacities of the examples were higher than those of the comparative examples. With respect to Comparative Example 3 in which the concentration of the lithium salt was 1 M, since the lithium secondary battery was not properly operated, it may be confirmed that it was difficult to measure the initial capacity and initial resistance.

4. Experimental Example 4: Evaluation of Capacity Retention at Room Temperature

After formation was performed on each of the lithium secondary batteries prepared in Examples 1 to 4 and Comparative Examples 1 to 8 at a current of 14 mA (0.1 C rate), discharge capacity in this case was set as initial capacity. Thereafter, CC/CV charging at 47 mA (0.33 C, 0.05 C cut-off) to 4.2 V and CC discharging at 47 mA (0.33 C) to 3 V were performed 200 times at room temperature (25° C.) respectively. Thereafter, 200th discharge capacity and the initial capacity were compared to calculate capacity retention at room temperature, and the results thereof are presented in Table 4.

TABLE 4

|  | Room-temperature capacity retention (%) |
|---|---|
| Example 1 | 92 |
| Example 2 | 92 |
| Example 3 | 94 |
| Example 4 | 93 |
| Comparative Example 1 | 88 |
| Comparative Example 2 | Not measurable |
| Comparative Example 3 | Not measurable |
| Comparative Example 4 | 87 |
| Comparative Example 5 | 89 |
| Comparative Example 6 | 89 |
| Comparative Example 7 | 90 |
| Comparative Example 8 | 92 |

Referring to Table 4, it may be confirmed that the capacity retentions at room temperature of the examples were equal to or higher than those of the comparative examples. In this case, since the initial capacities of the examples were higher than those of the comparative examples, it may be confirmed that the examples may maintain higher capacities at higher retention rates.

5. Experimental Example 5: High-temperature Safety Evaluation (Hot Box Test)

Tests were performed in which the lithium secondary batteries prepared in Examples 1 to 4 and Comparative Examples 1 to 8 were fully charged to a state of charge (SOC) of 100% and the lithium secondary batteries were then respectively left standing at 150° C. for 4 hours to confirm the presence of ignition and ignition start time. The results thereof are presented in Table 5 below.

TABLE 5

|  | Presence of ignition | Ignition start time (minutes) |
|---|---|---|
| Example 1 | x |  |
| Example 2 | x |  |
| Example 3 | x |  |
| Example 4 | x |  |
| Comparative Example 1 | o | 10< |
| Comparative Example 2 | Not measurable | Not measurable |
| Comparative Example 3 | Not measurable | Not measurable |
| Comparative Example 4 | o | 60 |
| Comparative Example 5 | x |  |
| Comparative Example 6 | x |  |
| Comparative Example 7 | x |  |
| Comparative Example 8 | o | 90 |

Referring to Table 5, it may be confirmed that ignition did not occur in all examples.

6. Experimental Example 6: Evaluation of Self-Extinguishing Properties (Self-Extinguish Time Value; SET Value)

1 g of each of the electrolytes for a lithium secondary battery prepared in Examples 1 to 4 and Comparative Examples 1 to 8 was weighed and prepared. Self-extinguishing properties were evaluated by a method of measuring time until fire was extinguished after each of the electrolytes was ignited, and the results thereof are presented in Table 6.

TABLE 6

|  | SET value (sec) |
|---|---|
| Example 1 | 10< |
| Example 2 | 10< |
| Example 3 | 10< |
| Example 4 | 10< |
| Comparative Example 1 | 100 |
| Comparative Example 2 | Not measurable |
| Comparative Example 3 | 20 to 30 |
| Comparative Example 4 | 10 to 20 |
| Comparative Example 5 | 10< |
| Comparative Example 6 | 10< |
| Comparative Example 7 | 10< |
| Comparative Example 8 | 10< |

Referring to Table 6, it may be confirmed that the fire was extinguished within 10 seconds for all examples.

7. Experimental Example 7: Measurement of the Occurrence of Pre-Gelation

Each of the compositions for a gel polymer electrolyte for a lithium secondary battery, which were prepared in Examples 3 and 4 and Comparative Examples 7 and 8, was accommodated in a pouch-type secondary battery case and then stored at room temperature (25° C.) for 3 days to perform room-temperature aging. Thereafter, NMR analysis (Bruker 700 MHz NMR, 1H NMR, Solvent:Aceton-d6) was performed on each of the compositions for a gel polymer electrolyte before/after the room-temperature aging to measure an area of a peak corresponding to acrylate double bond included before/after the room-temperature aging. Thereafter, each of the peak areas was compared to measure a degree of pre-gelation, and the results thereof are presented in Table 7.

TABLE 7

|  | Pre-gelation (%) |
|---|---|
| Example 3 | 10< |
| Example 4 | 10< |
| Comparative Example 7 | 10< |
| Comparative Example 8 | 40 |

Pre-gelation is a phenomenon due to a reaction between oligomers in an electrolyte wetting process, such as room-temperature aging, a step before being subjected to a curing process to form a gel polymer electrolyte, wherein it is a kind of side reaction that prevents the gel polymer electrolyte from being uniformly formed. Thus, referring to Table 7, with respect to the examples, it may be confirmed that the pre-gelation did not relatively proceed in comparison to the comparative examples. However, with respect to Comparative Example 7, the degree of pre-gelation was similar to those of the examples, but it may be confirmed that the initial capacity and room-temperature capacity retention of the battery of Comparative Example 7 were lower than those of the examples when referring to the experimental data.

The invention claimed is:

1. An electrolyte for a lithium secondary battery, comprising:
a lithium salt having a concentration of 1.6 M to 5 M;
an oligomer mixture which includes a first oligomer containing a unit represented by Formula 1 and a second oligomer containing a unit represented by Formula 2; and
an organic solvent:

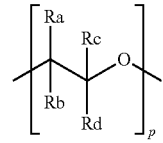

[Formula 1]

wherein, in Formula 1,
$R_a$, $R_b$, $R_c$, and $R_d$ are each independently fluorine or an alkyl group having 1 to 3 carbon atoms which is unsubstituted or substituted with fluorine, and
p is an integer of 1 to 50,

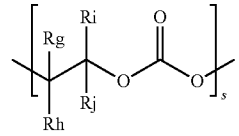

[Formula 2]

wherein, in Formula 2, $R_g$, $R_h$, $R_i$, and $R_j$ are each independently hydrogen, or a substituted or unsubstituted alkyl group having 1 to 5 carbon atoms, and
s is an integer of 1 to 50.

2. The electrolyte for a lithium secondary battery of claim 1, wherein the concentration of the lithium salt is in a range of 1.6 M to 4 M.

3. The electrolyte for a lithium secondary battery of claim 1, wherein the concentration of the lithium salt is in a range of 1.6 M to 3 M.

4. The electrolyte for a lithium secondary battery of claim 1, wherein the first oligomer is an oligomer represented by Formula 1a:

[Formula 1a]

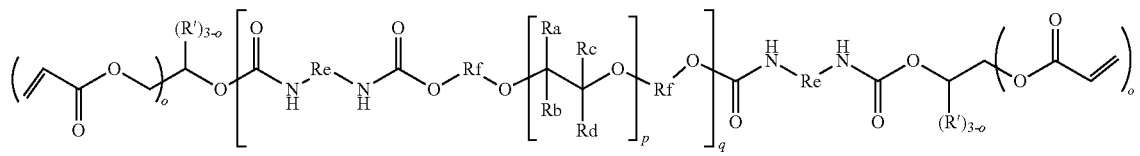

wherein, in Formula 1a, $R_a$, $R_b$, $R_c$, and $R_d$ are each independently fluorine or an alkyl group having 1 to 3 carbon atoms which is unsubstituted or substituted with fluorine, $R_e$ is an aliphatic hydrocarbon group or an aromatic hydrocarbon group, $R_f$ is an alkylene group having 1 to 5 carbon atoms which is unsubstituted or substituted with fluorine, R' is hydrogen or an alkyl group having 1 to 3 carbon atoms, o is an integer of 1 to 3, p is an integer of 1 to 50, and q is an integer of 1 to 15.

5. The electrolyte for a lithium secondary battery of claim 1, wherein the first oligomer is an oligomer represented by Formula 1b:

[Formula 1b]

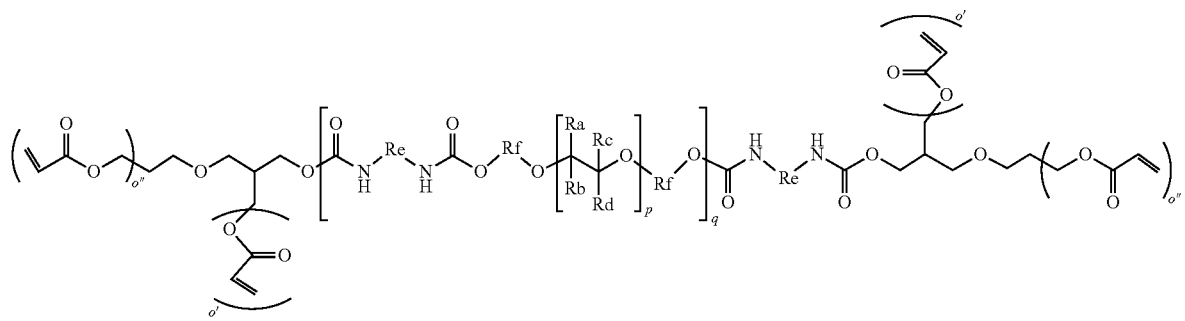

wherein, in Formula 1b, $R_a$, $R_b$, $R_c$, and $R_d$ are each independently fluorine or an alkyl group having 1 to 3 carbon atoms which is unsubstituted or substituted with fluorine, $R_e$ is an aliphatic hydrocarbon group or an aromatic hydrocarbon group, $R_f$ is an alkylene group having 1 to 5 carbon atoms which is unsubstituted or substituted with fluorine, o' is an integer of 1 to 2, o" is an integer of 1 to 3, p is an integer of 1 to 50, and q is an integer of 1 to 15.

6. The electrolyte for a lithium secondary battery of claim 1, wherein the second oligomer is an oligomer represented by Formula 2a:

[Formula 2a]

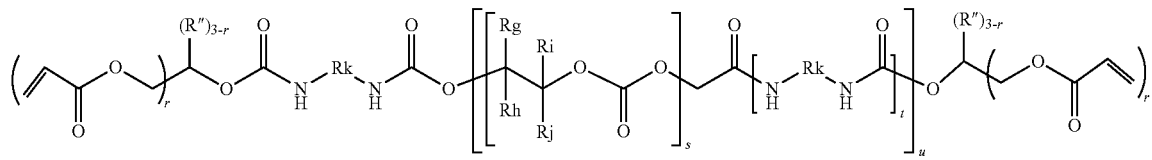

wherein, in Formula 2a, $R_g$, $R_h$, $R_i$, and $R_j$ are each independently hydrogen, or a substituted or unsubstituted alkyl group having 1 to 5 carbon atoms, $R_k$ is an aliphatic hydrocarbon group or an aromatic hydrocarbon group, R" is hydrogen or an alkyl group having 1 to 3 carbon atoms, r is an integer of 1 to 3, s is an integer of 1 to 50, t is an integer of 1 to 20, and u is an integer of 1 to 10.

7. The electrolyte for a lithium secondary battery of claim 1, wherein the second oligomer is an oligomer represented by Formula 2b:

[Formula 2b]

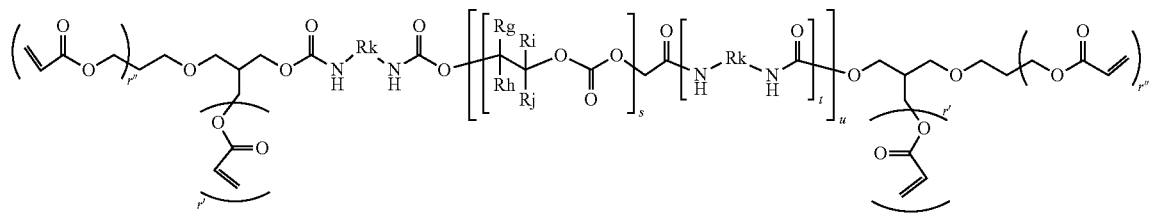

wherein, in Formula 2b, $R_g$, $R_h$, $R_i$, and $R_j$ are each independently hydrogen, or a substituted or unsubstituted alkyl group having 1 to 5 carbon atoms, $R_k$ is an aliphatic hydrocarbon group or an aromatic hydrocarbon group, r' is an integer of 1 to 2, r" is an integer of 1 to 3, s is an integer of 1 to 50, t is an integer of 1 to 20, and u is an integer of 1 to 10.

8. The electrolyte for a lithium secondary battery of claim 1, further comprising a halogenated benzene compound represented by Formula 3, wherein the halogenated benzene compound represented by Formula 3 is included in an amount of 0.01 part by weight or more to less than 50 parts by weight based on 100 parts by weight of the electrolyte for a lithium secondary battery:

[Formula 3]

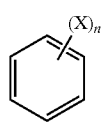

wherein, in Formula 3, X is at least one halogen selected from the group consisting of fluorine (F), chlorine (Cl), and bromine (Br), and n is an integer of 1 to 3.

9. The electrolyte for a lithium secondary battery of claim 1, wherein the electrolyte for a lithium secondary battery is a liquid electrolyte.

10. The electrolyte for a lithium secondary battery of claim 9, wherein the oligomer mixture is included in an amount of 0.01 part by weight to 1 part by weight based on 100 parts by weight of the electrolyte for a lithium secondary battery.

11. The electrolyte for a lithium secondary battery of claim 9, wherein the first oligomer and the second oligomer are mixed in a weight ratio of (10 to 50):(50 to 90).

12. The electrolyte for a lithium secondary battery of claim 1, wherein the electrolyte for a lithium secondary battery is a gel polymer electrolyte.

13. The electrolyte for a lithium secondary battery of claim 12, wherein the oligomer mixture is included in an amount of 2 parts by weight to 10 parts by weight based on 100 parts by weight of the electrolyte for a lithium secondary battery.

14. The electrolyte for a lithium secondary battery of claim 12, wherein the first oligomer and the second oligomer are mixed in a weight ratio of (1 to 50):(50 to 99).

15. The electrolyte for a lithium secondary battery of claim 12, further comprising a polymerization initiator.

* * * * *